(12) United States Patent
Bausch et al.

(10) Patent No.: US 8,548,397 B1
(45) Date of Patent: Oct. 1, 2013

(54) MOBILE WIRELESS COMMUNICATIONS DEVICE INCLUDING A POWER MODULE COUPLED TO A WIRELESS MODULE AND ASSOCIATED METHODS

(75) Inventors: Michael E. Bausch, Livonia, NY (US); Jason Scott, Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 54 days.

(21) Appl. No.: 13/456,748

(22) Filed: Apr. 26, 2012

(51) Int. Cl.
*H04B 1/38* (2006.01)
(52) U.S. Cl.
USPC ............... 455/90.3; 455/550.1; 455/575.1; 455/572; 455/90.1; 439/495; 439/65
(58) Field of Classification Search
USPC ............ 455/550.1, 572, 575.1, 90.3, 90.1; 439/495, 65
See application file for complete search history.

(56) References Cited

U.S. PATENT DOCUMENTS

| | | | |
|---|---|---|---|
| 5,127,849 A | 7/1992 | Karl et al. | |
| 7,255,959 B2 | 8/2007 | Chan | |
| 7,484,982 B1 | 2/2009 | Royle | |
| 2004/0203493 A1* | 10/2004 | Carlson | 455/90.1 |
| 2004/0248461 A1* | 12/2004 | Marcinkiewicz et al. | 439/495 |
| 2008/0254341 A1* | 10/2008 | Bailey et al. | 429/35 |
| 2009/0256759 A1* | 10/2009 | Hill et al. | 343/702 |
| 2010/0330935 A1 | 12/2010 | Maggert et al. | |
| 2011/0124206 A1* | 5/2011 | Goto | 439/65 |

* cited by examiner

*Primary Examiner* — Sanh Phu
(74) *Attorney, Agent, or Firm* — Allen, Dyer, Doppelt, Milbrath & Gilchrist, P.A.

(57) ABSTRACT

A mobile wireless communications device includes a power module with a first housing, at least one power cell carried by the first housing, and a first plurality of contact pads coupled to the at least one power cell and exposed on the first housing. A wireless module is adjacent the power module and includes a second housing having an opening therein, and wireless communications circuitry carried by the second housing and comprising a second plurality of contact pads aligned with the opening. A connector is in the opening and has a dielectric body, and a plurality of spring contacts carried by the dielectric body and exposed on opposite sides thereof coupling respective ones of the first and second pluralities of contact pads together.

19 Claims, 4 Drawing Sheets

MOBILE WIRELESS COMMUNICATIONS DEVICE INCLUDING A POWER MODULE COUPLED TO A WIRELESS MODULE AND ASSOCIATED METHODS

FIELD OF THE INVENTION

The present invention relates to the field of communications and, more particularly, to mobile wireless communications devices and related methods.

BACKGROUND OF THE INVENTION

Mobile wireless communications devices, such as radios, are typically powered by a battery or power cell. Some such devices have an openable housing which carries both wireless communications circuitry and the battery or power cell. Installation of a battery or power cell in these devices typically involves opening the housing, connecting the battery or power cell, and then closing the housing.

Other devices, however, have a first housing that carries the battery or power cell, and a second housing which carries wireless communications circuitry. These two housings are mated such that contacts from the battery or power cell are electrically coupled to contacts from the wireless communications circuitry.

One such device is described in U.S. Pat. Pub. 2010/0330935 to Maggert et al. Here, as described above, a mobile wireless communications device comprises a first housing carrying a power cell, and a second housing carrying wireless communications circuitry. A connector arrangement has a first set of contacts electrically coupled to the power cell, and a second set of contacts electrically coupled to the first set of contacts and to the wireless communications circuitry. This connector arrangement thereby couples the power cell to the wireless communications circuitry.

However, the contacts of the connector arrangement may momentarily lose electrical contact with the contacts of the power cell and wireless communications circuitry when the mobile wireless communications device experiences vibrations. This can cause loss of communications or damage the device. In addition, this connector arrangement may not provide a desired level of environmental sealing against water ingress.

As such, further developments in the field of mobile wireless communications are needed.

SUMMARY OF THE INVENTION

In view of the foregoing background, it is therefore an object of the present invention to provide a more reliable mobile wireless communications device with a power module coupled to a wireless module.

This and other objects, features, and advantages in accordance with the present invention are provided by a mobile wireless communications device that includes a power module comprising a first housing, at least one power cell carried by the first housing, and a first plurality of contact pads coupled to the at least one power cell and exposed on the first housing. In addition, a wireless module adjacent the power module comprises a second housing having an opening therein, and wireless communications circuitry carried by the second housing and comprising a second plurality of contact pads aligned with the opening. Furthermore, a connector is in the opening and comprises a dielectric body, and a plurality of spring contacts carried by the dielectric body and exposed on opposite sides thereof coupling respective ones of the first and second pluralities of contact pads together. The spring contacts advantageously maintain electrical contact between the first and second pluralities of contact pads regardless of accelerations or vibrations experienced by the mobile wireless communications device.

The connector may further comprise a sealing ring surrounding the dielectric body and engaging adjacent portions of the second housing. A gasket may be carried by at least one of the first housing and the second housing. The sealing ring and gasket help to form a watertight seal between the power module and wireless communications module when mated.

A method aspect is directed to a method of making a mobile wireless communications device to be powered by a power module comprising a first housing, at least one power cell carried by the first housing, and a first plurality of contact pads coupled to the at least one power cell and exposed on the first housing. The method includes forming a wireless module to have a second housing having an opening therein, and wireless communications circuitry carried by the second housing and comprising a second plurality of contact pads aligned with the opening.

The method further includes forming a connector to have a dielectric body and a plurality of spring contacts carried by the dielectric body and exposed on opposite sides thereof, and positioning the connector in the opening. The method also includes positioning the power module adjacent the wireless module such that the plurality of spring contacts of the connector couple respective ones of the first and second pluralities of contact pads together.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
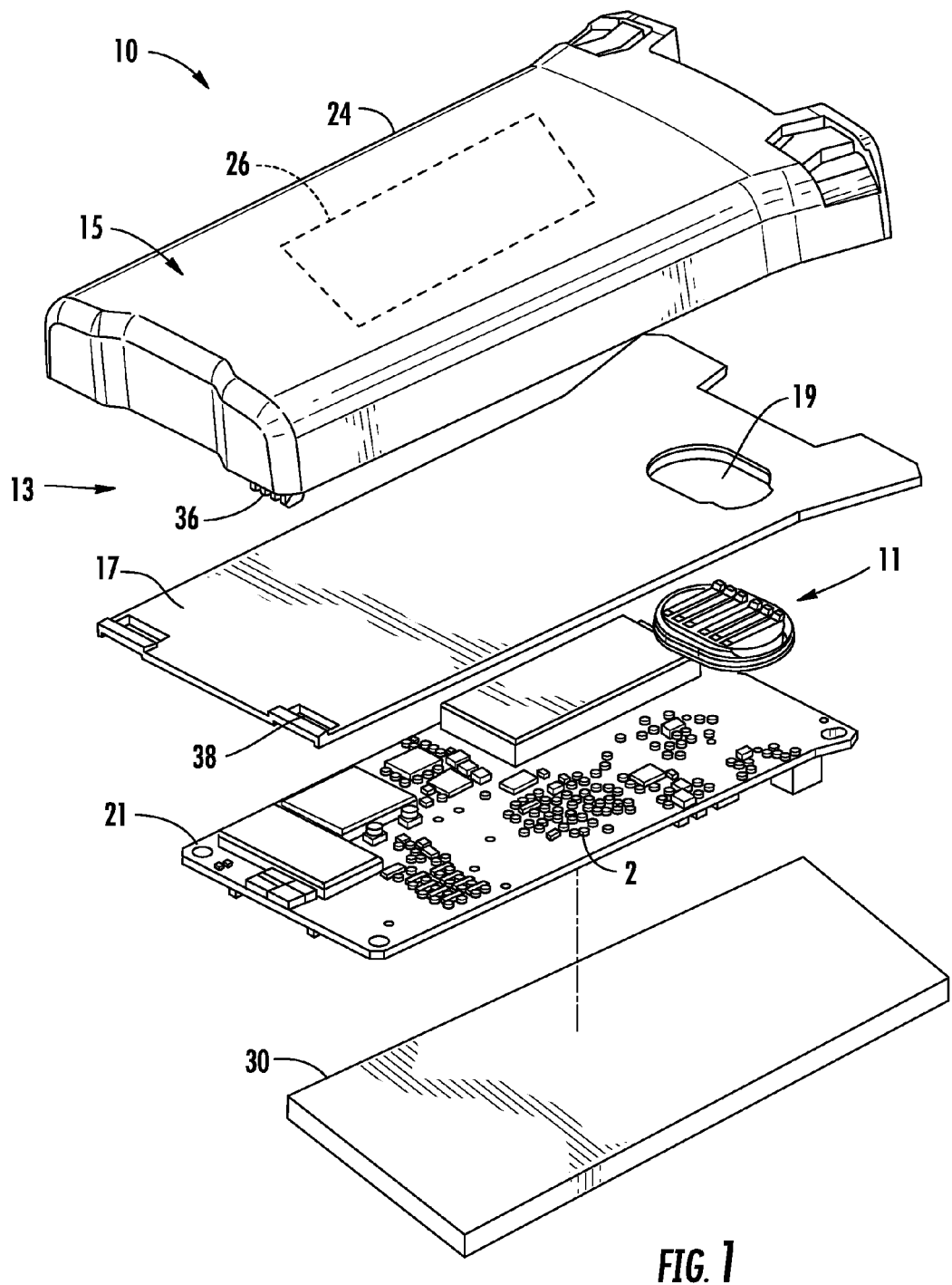
FIG. 1 is an exploded diagram of a mobile wireless communications device, in accordance with the present invention.
Figure 2:
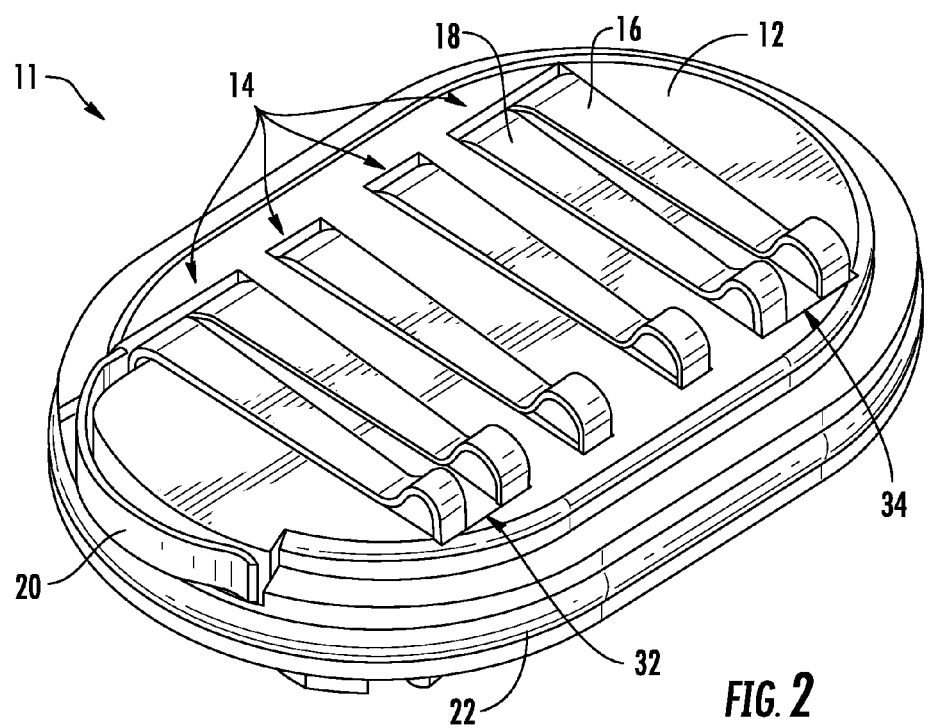
FIG. 2 is a top perspective view of the connector of FIG. 1.
Figure 3:
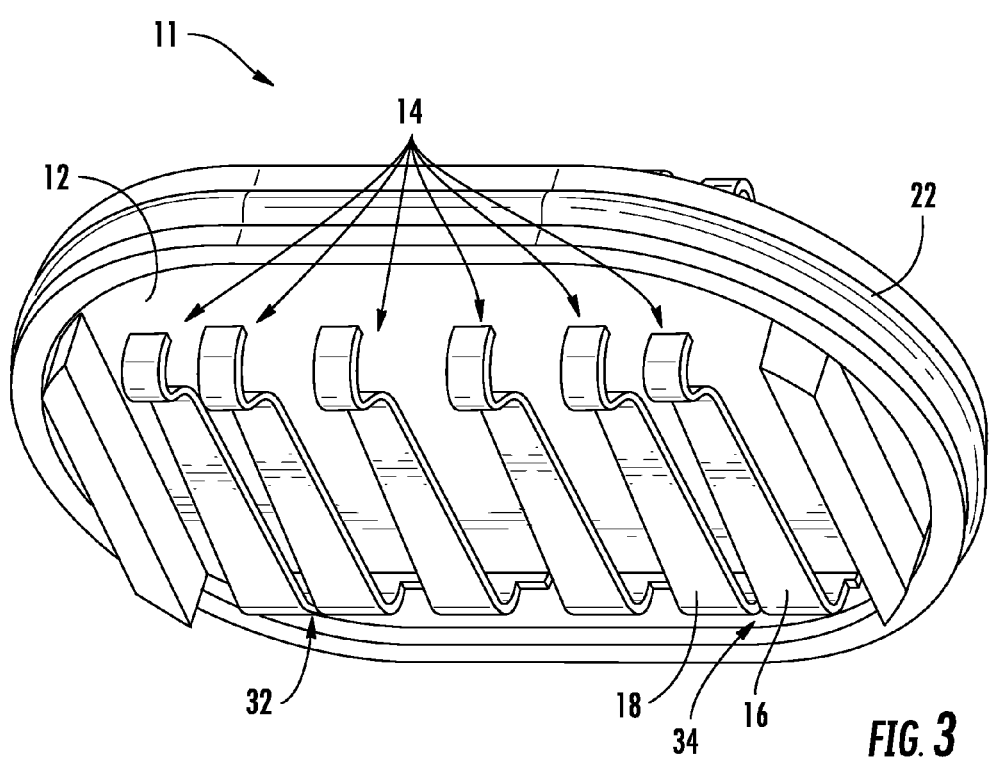
FIG. 3 is a bottom perspective view of the connector of FIG. 1.

Referring initially to FIGS. 1-3, a mobile wireless communications device 10 comprises a power module 15 powering a wireless module 21. A connector 11 couples the power module 15 to the wireless module 21.

Figure 6:
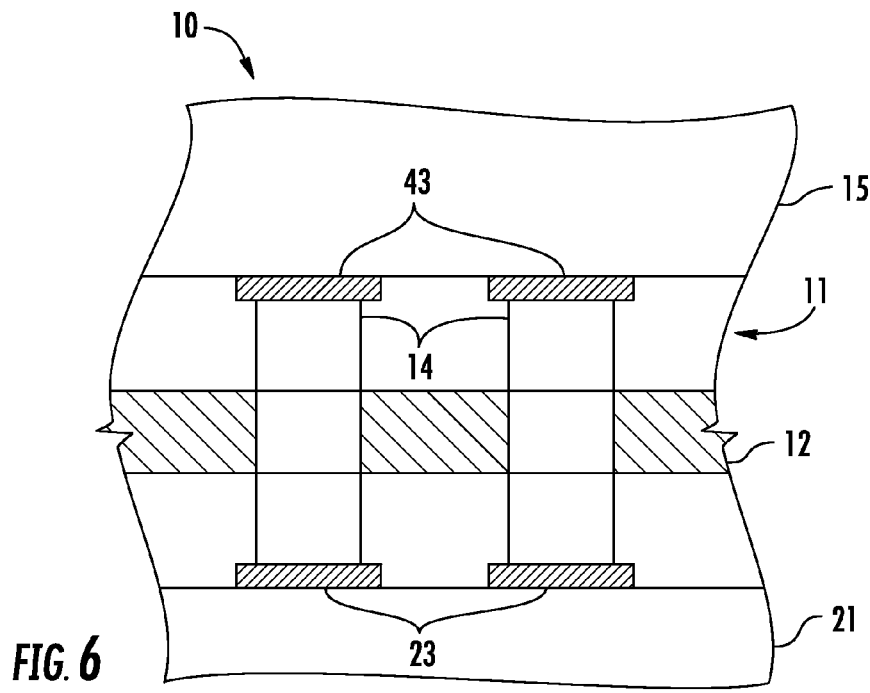
FIG. 6 is a cross sectional view of the mobile wireless communications device of FIG. 1, as assembled, illustrating the connector electrically coupling the power module to the wireless module.

The power module 15 comprises a first housing 24, and at least one power cell 26 carried by the first housing. A first plurality of contact pads 43 (shown in FIG. 6) are coupled to the at least one power cell 26 and exposed on the first housing 24. Those skilled in the art will appreciate that there may be a plurality of power cells 26, and that these power cells may be rechargeable or non-rechargeable. In addition, it should be understood that the power cells 26 may be battery cells, or other sources of power, such as fuel cells.

There is a wireless module 21 adjacent the power module 15 that comprises a second housing 13. The second housing has first and second halves 17, 30 that are mateable and carry wireless communications circuitry 28. The wireless communications circuitry 28 includes a second plurality of contact pads 23 (shown in FIG. 6) that are aligned with an opening 19 in the first half 17.

The power module 15 and the wireless module 21 each comprise respective mating features 36, 38 to help keep the power module and the wireless mobile securely mated together under stresses such as acceleration and vibration.

The connector 11 can be considered to be part of the wireless module 21, and is positioned in the opening 19 and serves to electrically couple the first and second pluralities of contact pads 43, 23, thereby electrically coupling the power module 15 with the wireless module 21. The connector 11 is perhaps best shown in FIGS. 2-3, and comprises an oval shaped dielectric body 12, and a plurality of spring contacts 14 carried by the dielectric body and exposed on opposite sides thereof to couple respective ones of the first and second pluralities of contact pads 43, 23 together. The dielectric body 12 need not be oval shaped, and may take other shapes.

Figure 5:
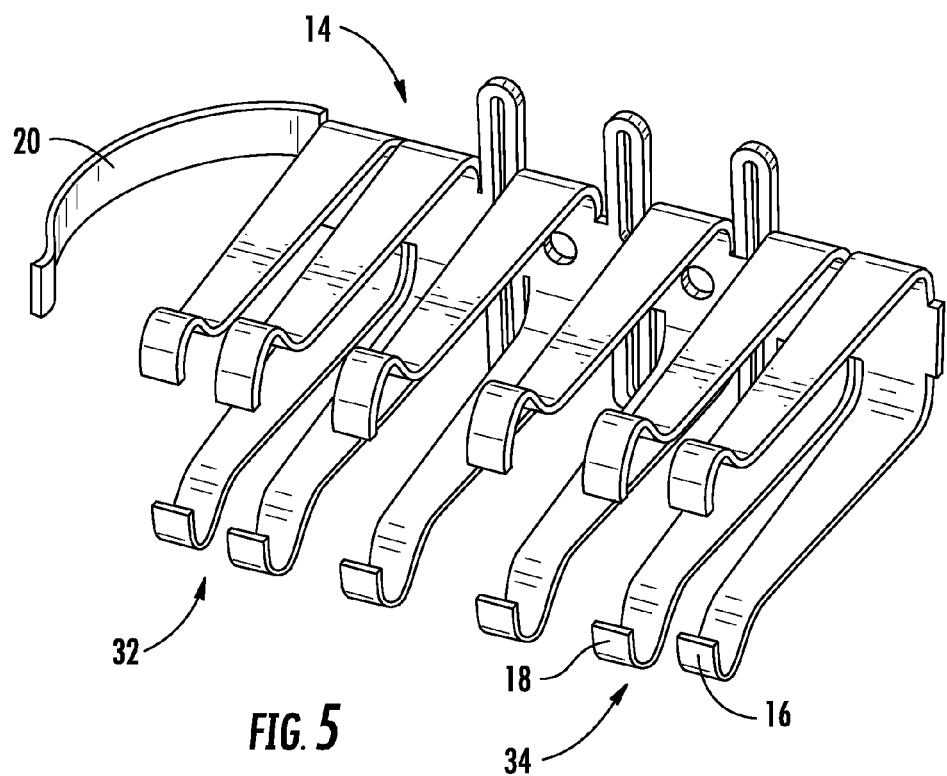
FIG. 5 is a perspective view of the plurality of spring contacts of the connector of FIG. 1.

The spring contacts 14 are integrally molded within the dielectric body 12, meaning that, in some applications, the spring contacts are formed separately (as shown in FIG. 5), and then the dielectric body is molded around the spring contacts. Therefore, the connector 11 is a solid monolithic unit. The spring contacts 14 are illustratively leaf springs, and are u-shaped (as shown in FIG. 5) but it should be understood that they may take different shapes in other embodiments.

The spring contacts 14 include two pairs of parallel-connected spring contacts 32, 34, and it should be understood that each spring contact of a parallel-connected pair may have a different spring rate. For example, the spring contacts 16, 18 of the parallel-connected spring contact pair 34 have different spring rates. The use of different spring rates helps ensure that, when the mobile wireless communications device 10 experiences accelerations or vibrations, at least one spring contact of a given pair stays in contact with the first and second pluralities of contact pads 43, 23, since each spring contact of that pair will have a different resonance frequency.

Figure 4:
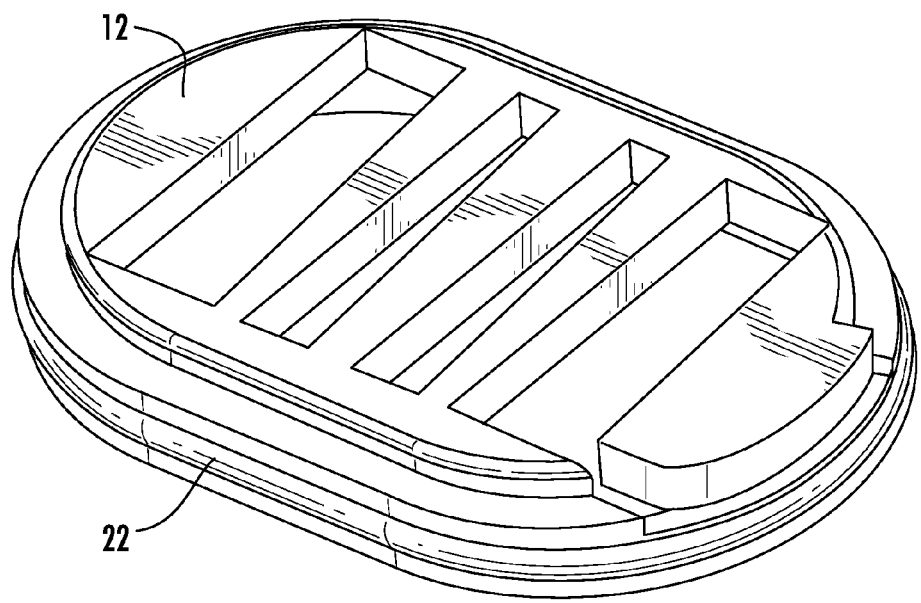
FIG. 4 is a perspective view of the dielectric body of the connector of FIG. 1.

The wireless mobile 21 includes a chassis ground, which provides a stable reference voltage. In the illustrated embodiment, the second half 17 of the second housing 13 is configured as the chassis ground. A spring contact 20 (shown in FIGS. 2 and 4) couples respective ones of the first and second pluralities of contact pads 43, 23 to the chassis ground 17.

A sealing ring 22 surrounds the dielectric body 12 and engages adjacent portions of the second housing 13. In addition, a gasket (not shown) is carried by either the first housing 24 or the second housing 13. As will be explained, the sealing ring 22 and gasket help make the mobile wireless communications device 11 watertight to a limited depth.

The first housing 24 is watertight to a limited depth, thereby protecting the power cells 26. Only the first plurality of contact pads 43 are exposed, and these contacts pads are constructed from a material resistant to corrosion. In addition, the second housing 13 is also watertight to a limited depth, thereby protecting the wireless communications circuitry 28. The gasket helps to prevent entry of water to the interstice between the first and second housings 24, 13 when the mobile wireless communications device 10 is assembled. In the event that water should enter the interstice between the first and second housings 24, 13, the sealing ring 22 helps prevent the entry of water into the hole 19.

Figure 7:
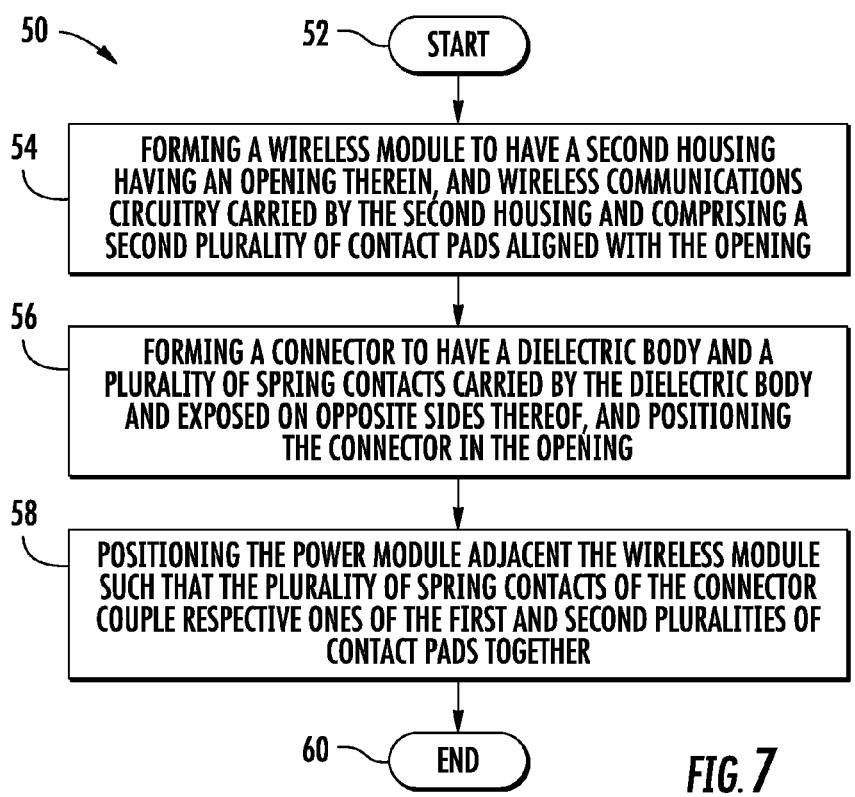
FIG. 7 is a flowchart of a method of making a mobile wireless communications device, in accordance with the present invention.

With reference to the flowchart 50 of FIG. 7, therein is illustrated a method of making a mobile wireless communications device to be powered by a power module comprising a first housing, at least one power cell carried by the first housing, and a first plurality of contact pads coupled to the at least one power cell and exposed on the first housing. After the start (Block 52), the method includes forming a wireless module to have a second housing having an opening therein, and wireless communications circuitry carried by the second housing and comprising a second plurality of contact pads aligned with the opening (Block 54).

The method then includes forming a connector to have a dielectric body and a plurality of spring contacts carried by the dielectric body and exposed on opposite sides thereof, and positioning the connector in the opening (Block 56). Thereafter, the method progresses to positioning the power module adjacent the wireless module such that the plurality of spring contacts of the connector couple respective ones of the first and second pluralities of contact pads together (Block 58). Block 60 indicates the end of the method.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a power module comprising a first housing, at least one power cell carried by said first housing, and a first plurality of contact pads coupled to said at least one power cell and exposed on said first housing; and
a wireless module disposed adjacent said power module and comprising a second housing having an opening therein, and wireless communications circuitry carried by said second housing and comprising a second plurality of contact pads aligned with the opening;
said wireless module further comprising a connector in the opening and comprising a dielectric body, and a plurality of spring contacts carried by said dielectric body and exposed on opposite sides thereof coupling respective ones of the first and second pluralities of contact pads together.

2. The mobile wireless communications device of claim 1, wherein said plurality of spring contacts are integrally molded with said dielectric body.

3. The mobile wireless communications device of claim 1, wherein at least some of said plurality of spring contacts comprise at least one pair of parallel-connected spring contacts, with each spring contact thereof having a different spring rate.

4. The mobile wireless communications device of claim 1, wherein said plurality of spring contacts comprises a plurality of leaf springs.

5. The mobile wireless communications device of claim 1, wherein said connector further comprises a sealing ring surrounding said dielectric body and engaging adjacent portions of said second housing.

6. The mobile wireless communications device of claim 1, wherein said second housing comprises first and second halves that are mateable, with said wireless communications circuitry positioned between said first and second halves, and with one of the halves being configured as a chassis ground coupled to said wireless communications circuitry; and wherein at least one spring contact of said plurality thereof couples respective ones of the first and second pluralities of contact pads to the chassis ground.

7. The mobile wireless communications device of claim 1, wherein each of said plurality of spring contacts is U-shaped.

8. The mobile wireless communications device of claim 1, wherein said dielectric body has an oval shape.

9. The mobile wireless communications device of claim 1, wherein said power module and said wireless module each comprises respective mating features.

10. A wireless module for a mobile wireless communications device to be powered by a power module comprising a first housing, at least one power cell carried by the first housing, and a first plurality of contact pads coupled to the at least one power cell and exposed on the first housing, the wireless module comprising:
   a second housing having an opening therein, and wireless communications circuitry carried by said second housing and comprising a second plurality of contact pads aligned with the opening; and
   a connector in the opening and comprising a dielectric body, and a plurality of spring contacts carried by said dielectric body and exposed on opposite sides thereof coupling respective ones of the first and second pluralities of contact pads together.

11. The wireless module of claim 10, wherein said plurality of spring contacts are integrally molded with said dielectric body.

12. The wireless module of claim 10, wherein at least some of said plurality of spring contacts comprise at least one pair of parallel-connected spring contacts, with each spring contact thereof having a different spring rate.

13. The wireless module of claim 10, wherein said plurality of spring contacts comprises a plurality of leaf springs.

14. The wireless module of claim 10, wherein said connector further comprises a sealing ring surrounding said dielectric body and engaging adjacent portions of said second housing.

15. A method of making a wireless module for a mobile wireless communications device to be powered by a power module comprising a first housing, at least one power cell carried by the first housing, and a first plurality of contact pads coupled to the at least one power cell and exposed on the first housing, the method comprising:
   forming a second housing having an opening therein,
   carrying wireless communications circuitry by the second housing,
   forming a second plurality of contact pads aligned with the opening;
   forming a connector to have a dielectric body and a plurality of spring contacts carried by the dielectric body and exposed on opposite sides thereof, and positioning the connector in the opening; and
   positioning the power module adjacent the wireless module such that the plurality of spring contacts of the connector couple respective ones of the first and second pluralities of contact pads together.

16. The method of claim 15, comprising integrally molding the plurality of spring contacts with the dielectric body.

17. The method of claim 15, comprising forming the connector such that at least some of the plurality of spring contacts comprise at least one pair of parallel-connected spring contacts, with each spring contact thereof having a different spring rate.

18. The method of claim 15, comprising forming the connector such that the plurality of spring contacts comprise a plurality of leaf springs.

19. The method of claim 15, comprising forming the connector to have a sealing ring surrounding the dielectric body and engaging adjacent portions of the second housing.

\* \* \* \* \*